(12) United States Patent
Chen

(10) Patent No.: US 8,600,537 B2
(45) Date of Patent: Dec. 3, 2013

(54) INSTANT PRODUCTION PERFORMANCE IMPROVING METHOD

(75) Inventor: Chee-Cheng Chen, Pingtung County (TW)

(73) Assignee: National Pingtung University of Science & Technology, Pingtung County (TW)

( * ) Notice: Subject to any disclaimer, the term of this patent is extended or adjusted under 35 U.S.C. 154(b) by 452 days.

(21) Appl. No.: 12/913,013

(22) Filed: Oct. 27, 2010

(65) Prior Publication Data

US 2011/0301737 A1 Dec. 8, 2011

(30) Foreign Application Priority Data

Jun. 8, 2010 (TW) .............................. 99118595 A

(51) Int. Cl.
*G06F 19/00* (2011.01)
(52) U.S. Cl.
USPC ........................................................ 700/111
(58) Field of Classification Search
USPC ........................................................ 700/111
See application file for complete search history.

(56) References Cited

U.S. PATENT DOCUMENTS

| | | | |
|---|---|---|---|
| 6,622,055 B2 * | 9/2003 | Fan et al. ......................... | 700/99 |
| 7,006,878 B2 * | 2/2006 | Schweizerhof et al. ......... | 700/51 |
| 7,113,838 B2 * | 9/2006 | Funk et al. ...................... | 700/108 |
| 7,218,974 B2 * | 5/2007 | Rumi et al. ...................... | 700/28 |
| 7,257,513 B2 * | 8/2007 | Lilly .............................. | 702/182 |
| 2002/0026257 A1 | 2/2002 | Newmark | |
| 2007/0270992 A1 * | 11/2007 | Nishida et al. ................ | 700/111 |
| 2009/0149983 A1 * | 6/2009 | Dennis et al. ................. | 700/111 |

FOREIGN PATENT DOCUMENTS

TW 200717342 5/2007

* cited by examiner

*Primary Examiner* — Mohammad Ali
*Assistant Examiner* — Sivalingam Sivanesan
(74) *Attorney, Agent, or Firm* — Muncy, Geissler, Olds & Lowe, PLLC

(57) ABSTRACT

The invention discloses a real-time production performance improving method comprising a real-time monitoring step, a performance satisfaction determination step and a real-time performance improving step. The real-time monitoring step monitors an operation status of a production machine via a monitoring unit, records the monitored operation status into a database and determines whether the operation status of the production machine has changed. The performance satisfaction determination step determines whether the change in the operation status meets a required performance level. This involves the monitoring unit monitoring the at least one production machine to detect a next change in the operation status of the at least one production machine, and the performance satisfaction determination step determining whether the next change in the operation status meets the required performance level. The real-time performance improving step sends information illustrating the problem to an assigned task team.

12 Claims, 3 Drawing Sheets

INSTANT PRODUCTION PERFORMANCE IMPROVING METHOD

BACKGROUND OF THE INVENTION

1. Field of the Invention

The present invention generally relates to a real-time production performance improving method and, more particularly, to a real-time production performance improving method that can be combined with information technology for quickly solving problems of a production line.

2. Description of the Related Art

In the modern competitive society, manufacturers have been striving to improve their product qualities by recruiting more machines and human labors. Furthermore, it is getting difficult to make profits from products due to price war among competitors. Thus, product quality has become a key to business success. In light of this, a management system that reduces costs and improves product quality is required for improving enterprises' competitiveness.

Taiwan Publication Number 200717342 discloses a real-time production performance tracking and managing system. The real-time production performance tracking and managing system includes an organization maintenance unit, a performance indicator unit, a performance planning unit, a performance execution unit, a performance tracking unit and a servo unit. The organization maintenance unit establishes and maintains organization structures of an enterprise. The performance indicator unit establishes and manages a plurality of performance indicators to be evaluated. The performance planning unit chooses suitable performance indicators for individual departments and individual employees from the performance indicators provided by the performance indicator unit, and sets performance objectives for the individual departments and the individual employees. The performance execution unit allows an employee or a department manager to input performance evaluation information illustrating a performance fulfillment level in a certain period of time. The performance tracking unit tracks the performance fulfillment level of the individual departments and the individual employees, and calculates and displays the performance fulfillment level of individual performance items. The servo unit includes a database system which is connected to all of the above units for storing the processed data of these units.

However, the above real-time production performance tracking and managing system is only capable of managing the performance fulfillment level of individual departments of the enterprise rather than analyzing various problems of production machines that could arise during operation of the production machines. In other words, the system does not have a mechanism that can rapidly respond to and solve the problems during operation of the production machines. In addition, modern enterprises mostly use a mechanism of Six Sigma to solve the problems. However, the mechanism of Six Sigma costs a lot of money and takes a long time to run, making it difficult to timely solve the problems during operation of the production machines. Thus, quickly improving product quality is difficult.

SUMMARY OF THE INVENTION

It is therefore the primary objective of this invention to monitor production conditions of the manufacturing process in a real-time manner according to information regarding overall production performances of production lines collected by an IT (information technology) based system, as well as information regarding operation statuses of production machines. Information of performance gap is collected and further classified and analyzed for immediately solving problems, thereby providing production performance improving method very quickly.

The invention discloses a real-time production performance improving method comprising a real-time monitoring step, a performance satisfaction determination step and a real-time performance improving step. The real-time monitoring step instantly monitors an operation status of at least one production machine via a monitoring unit, records the monitored operation status into a database and determines whether the operation status of the at least one production machine has changed. The performance satisfaction determination step determines whether the change in the operation status meets a required performance level when the operation status of the at least one production machine has changed. This involves the monitoring unit monitoring the at least one production machine to detect a next change in the operation status of the at least one production machine when the change in the operation status meets the required performance level, and the performance satisfaction determination step determines whether the next change in the operation status meets the required performance level. The real-time performance improving step sends information illustrating at least one problem that causes the change in the operation status to an assigned task team for prompt analysis when the change in the operation status does not meet the required performance level. This involves the monitoring unit monitoring the operation status of the at least one production machine in order for the at least one problem to be solved, and the at least one problem constantly showing up until the at least one problem is solved.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
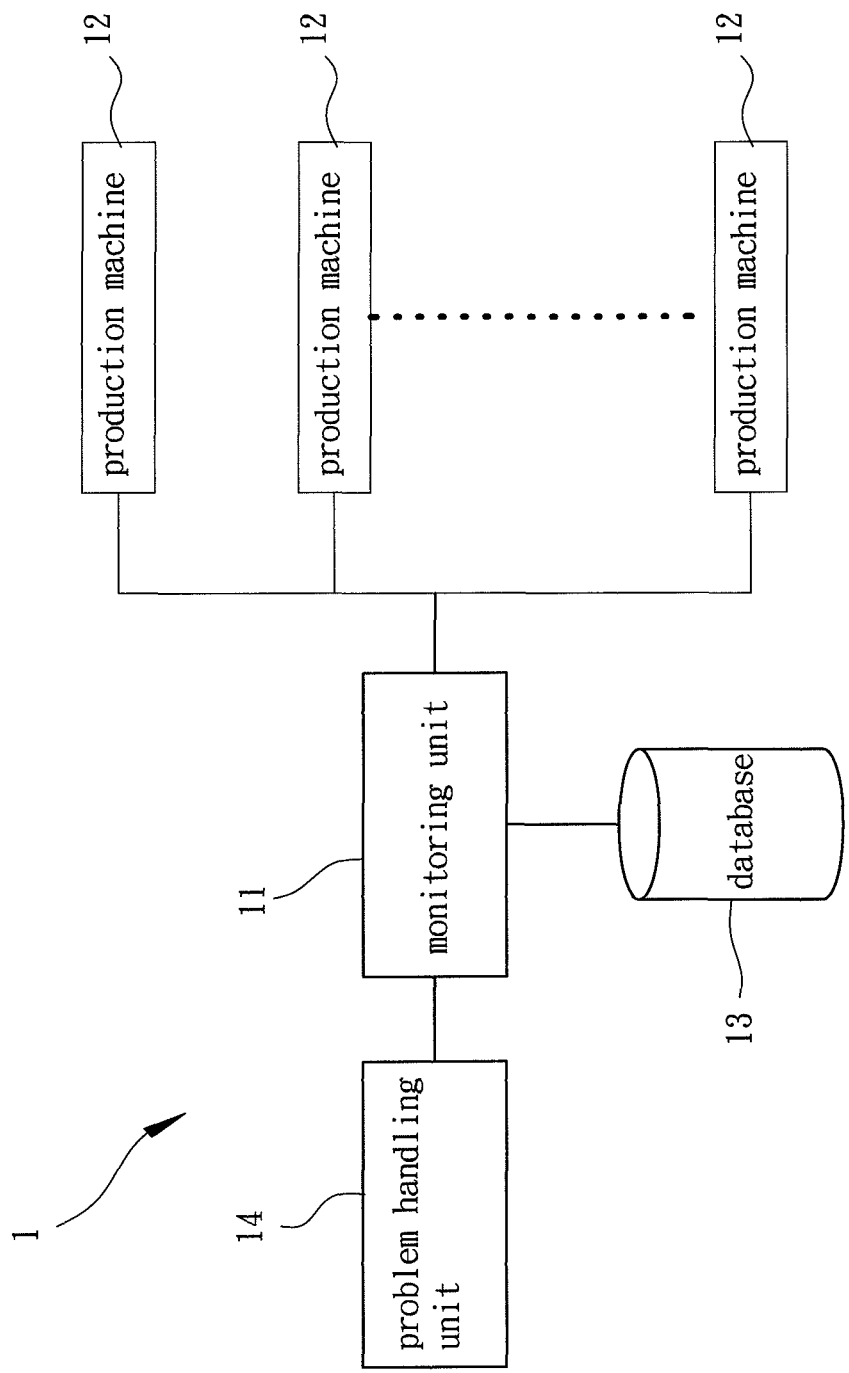
FIG. 1 shows a block diagram of a real-time production performance improving system according to a first embodiment of the invention.

In the various figures of the drawings, the same numerals designate the same or similar parts. Furthermore, when the term "first", "second", "third", "fourth", "inner", "outer" "top", "bottom" and similar terms are used hereinafter, it should be understood that these terms refer only to the structure shown in the drawings as it would appear to a person viewing the drawings and are utilized only to facilitate describing the invention.

DETAILED DESCRIPTION OF THE INVENTION

Referring to FIG. 1, a real-time production performance improving method includes a step of constructing a real-time production performance improving system 1 according to a preferred embodiment of the invention. The real-time production performance improving system 1 includes a monitoring unit 11, at least one production machine 12, at least one database 13 and at least one problem handling unit 14.

The monitoring unit 11 is electrically connected to the at least one production machine 12 and the at least one database 13 in a wired or wireless manner. Therefore, operation status of the at least one production machine 12 may be monitored by the monitoring unit 11 and stored in the at least one database 13.

The at least one production machine 12 is used to manufacture a predetermined product such as semiconductor products. In the embodiment, the number of the at least one production machine 12 is plural. Each production machine 12 has three operation statuses "OFF", "normal" and "shutdown" during operation.

The database 13 establishes a status table, a problem classification table or other essential information. Based on this, once the monitoring unit 11 determines operation statuses of the production machines 12, the determined operation statuses may be stored in the status table. Also, problems that occur during operation of the production machines 12 may be recorded. The problem classification table may be used to store information such as machine identification (ID), machine location, product ID, product type, bill of materials (BOM) of products and unsatisfied performance level.

The problem handling unit 14 is electrically connected to the monitoring unit 11. The problem handling unit 14 is used to solve various problems of the production machines 12 during their operation. As an example, the problem handling unit 14 sends information illustrating problems of the production machines 12 to an assigned task team. Accordingly, the task team may start to work on the problems based on the received information. The task team may contain members who are experienced in the related fields to quickly solve the problems of the production machines 12 during their operation.

The real-time production performance improving system 1 may execute a real-time production performance improving method which comprises a real-time monitoring step S1, a performance satisfaction determination step S2 and a real-time performance improving step S3. Based on the steps, problems that arise during operation of the production machines 12 may be handled in the first place and can be promptly solved. Thus, better production performance is attained.

Figure 2:
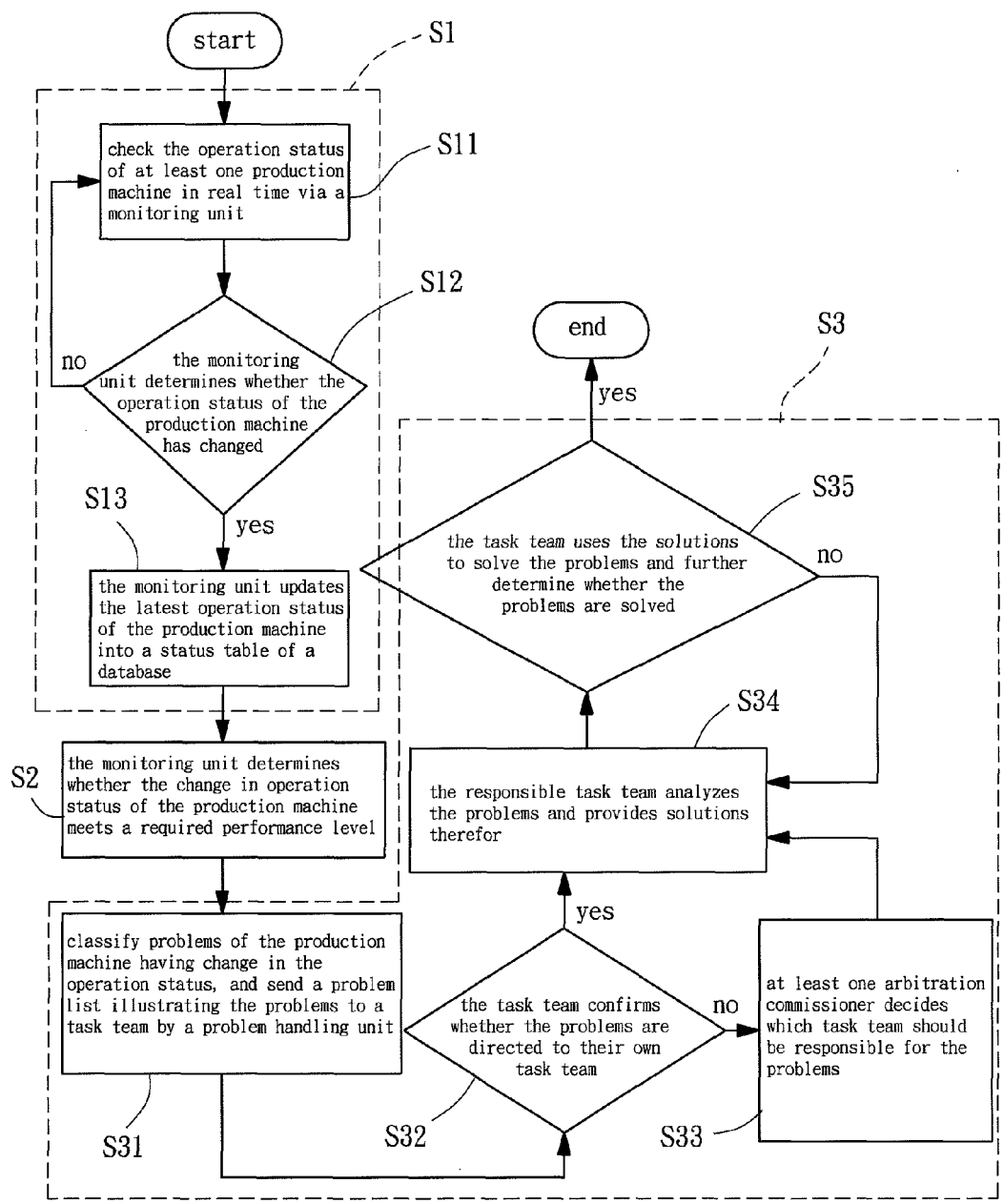
FIG. 2 shows a flowchart of a real-time production performance improving method according to the first embodiment of the invention.

Referring to FIGS. 1 and 2, the real-time monitoring step S1 checks the operation statuses of the production machines 12 in real time and determines whether the operation statuses of the production machines 12 have changed. If so, the operation statuses of the production machines 12 are immediately updated. The real-time monitoring step S1 preferably includes a status checking step S11, a status determination step S12 and a status updating step S13.

The status checking step S11 checks the operation statuses of the production machines 12 in real time via the monitoring unit 11, with three possible operation statuses "OFF", "normal" and "shutdown" as described above. Specifically, assuming that a plurality of production machines 12 are available, the monitoring unit 11 may set a period of monitoring time and monitor the operation status of each production machine 12 in real time based on the period of monitoring time.

The status determination step S12 determines whether the operation statuses of the production machines 12 have changed via the monitoring unit 11. If so, the status updating step S13 is performed. If not, the status checking step S11 is re-performed. Specifically, the changes in status of the production machines 12 may be categorized into "OFF to normal", "normal to OFF", "normal to shutdown" and "shutdown to normal". For instance, when the monitoring unit 11 detects that one production machine 12 (with machine ID of 001) is in the shutdown status, the monitoring unit 11 may check the table of status of the database 13 to see the previous operation status of that production machine 12. If the previous operation status of that production machine 12 is "normal", the monitoring unit 11 determines that the production machine 12 has a change in operation status.

The status updating step S13 updates the table of status of the database 13 according to the detected results of the monitoring unit 11. Thus, the latest operation statuses of the production machines 12 may be updated into the table of status of the database 13 for execution of the real-time performance improving step S3. For example, if the production machine 12 with machine ID of 001 has a change in status from "normal" to "shutdown", the monitoring unit 11 may change the record of status of the production machine 12 with ID 001 to "shutdown" in the table of status, and further record all the problems of that production machine 12 in the table of status. The performance satisfaction determination step S2 determines whether the change in status of the production machine 12 meets a required performance level. If not, the real-time performance improving step S3 is executed. If so, the real-time performance improving step S3 is not executed, and the monitoring unit 11 keeps monitoring all the production machines 12 and determines whether each change in status of the production machines 12 (if any) meets the required performance level.

The required performance level mentioned above may be determined based on Key Performance Indicator (KPI), which may have different standards according to the needs of different enterprise or organizations. For example, the KPI of the invention may be set based on a following manner: (1) the total number of times of shutdown should be less than 10; (2) the number of times of shutdown caused by the same problem should be less than 6; and (3) the shutdown period should be shorter than 2 hours.

Take the first condition as an example, if the operation status of the production machine 12 with ID 001 has changed from "normal" to "shutdown" for more than 10 times, the production machine 12 with ID 001 is determined to be in abnormal operation. Thus, corresponding measures must be taken to solve the abnormality.

For the second condition, if a problem A keeps causing a certain production machine 12 to shutdown for more than 6 times, the problem A should be solved immediately.

For the third condition, if the production machine 12 with ID 001 has a shutdown period longer than 2 hours, it indicates that production machine 12 has been idle for 2 hours and immediate trouble shooting is required.

Furthermore, the required performance level may also be determined based on the amount of property loss. For example, if one production machine 12 remains shutdown for 2 hours, the costs/property loss resulted from the shutdown may be further calculated to provide more accurate evaluation of the required performance level.

Referring to FIGS. 1 and 2, the real-time performance improving step S3 sends the information illustrating the problems of the production machines 12 to the assigned task team for prompt analysis in order to quickly solve the problems. Specifically, the real-time performance improving step S3 comprises a problem classification step S31, a problem confirmation step S32, an arbitration step S33, an analyzing and improving step S34 and a solution confirmation step S35.

The problem classification step S31 classifies the problems of the production machine 12 when the monitoring unit 11 determines that the changes in status of the production machines 12 do not meet the required performance level.

Based on the problem classification, an assigned task team directed to and in charge of the problems may be determined. Upon determination of the responsible task team, the problem handling unit 14 sends a problem list to the task team. Specifically, if the change in status of one production machine 12 does not meet the required performance level and the production machine 12 has the problem A, the monitoring unit 11 may classify the problem A with reference to the content of the problem classification table of the database 13. If the problem A is associated with a "product type" of problem, the task team who specializes in that type of problem will need to deal with the problem. The problem list is sent by the problem handling unit 14 to the responsible task team to quickly solve the problem A.

In the problem confirmation step S32, a person in charge of the task team (or team leader) confirms whether the problem A is directed to his/her own task team. If the person determines that his/her own task team is not responsible for the problem A, the arbitration step S33 is performed. On the contrary, if the team leader determines that his/her own task team is responsible for the problem A, the analyzing and improving step S34 is performed.

The arbitration step S33 is mainly performed by at least one arbitration commissioner who decides which task team should be responsible for the problem A. Thus, the problem A may be handled by a proper/correct task team.

In the analyzing and improving step S34, the responsible task team starts to analyze the problem A based on their professions and experiences. Therefore, solutions of the problem A may be provided and the solution confirmation step S35 is performed. In addition, the analyzing and improving step S34 may analyze the problem A in a mechanism of D MAIC or other suitable mechanisms to find out proper solutions of the problem A. Furthermore, in a case where several problems are presented, every type of problems is primarily handled by a single task team. However, a single task team may also handle several types of problems depending on the source of problems.

In the solution confirmation step S35, the task team may use the solutions to solve the problems of the production machine 12 and further determine whether the problems are really solved. If so, the real-time production performance improving method of the invention is terminated. If not, the analyzing and improving step S34 is re-performed.

Figure 3:
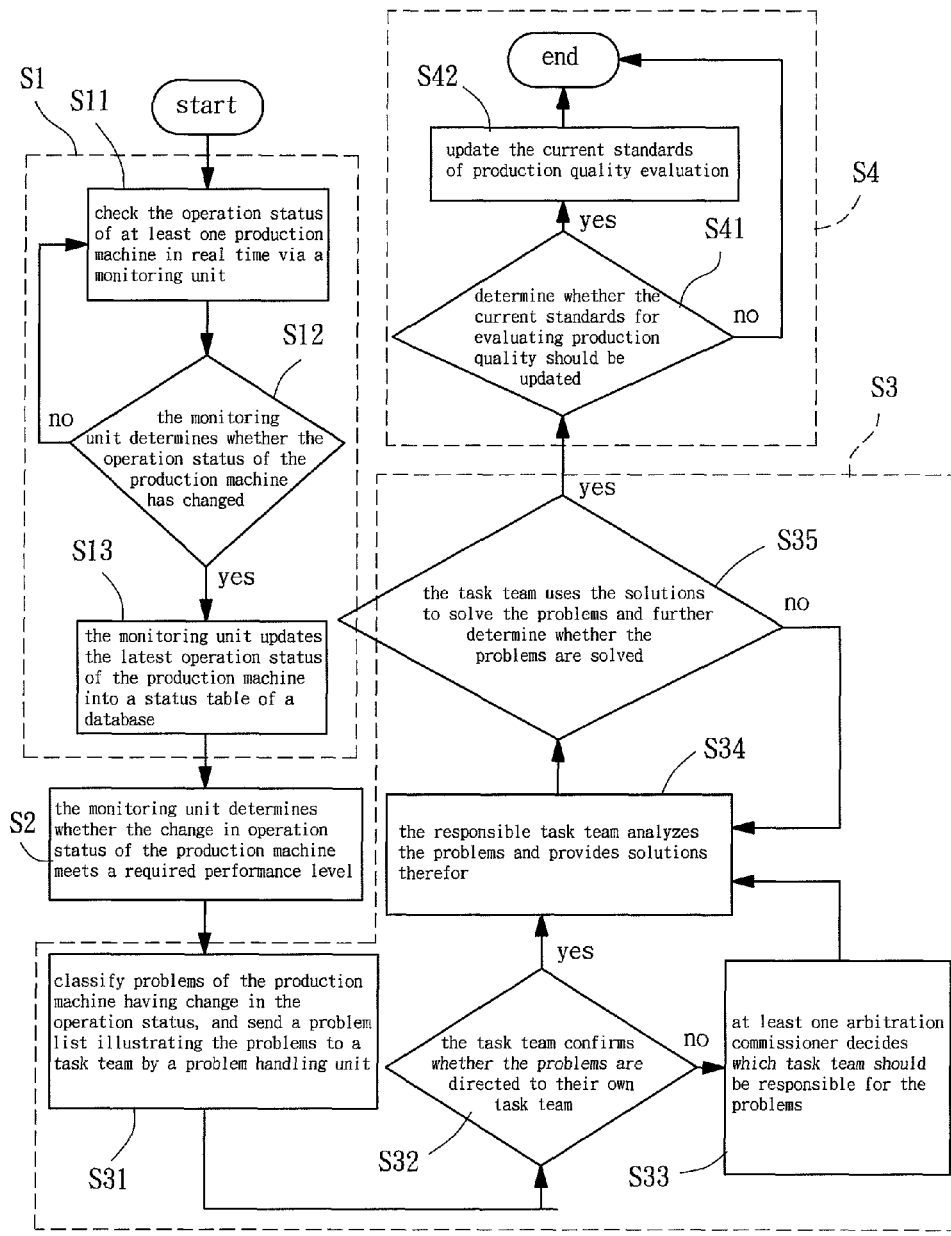
FIG. 3 shows a flowchart of a real-time production performance improving method according to a second embodiment of the invention.

Referring to FIG. 3, the real-time production performance improving method may further include an update step S4 following the real-time performance improving step S3. The update step S4, based on the experiences that the task team has gained from solving problems, determines whether the current standards for evaluating production quality performance, such as product specification, production process, performance standards and so on, should be updated (step S41). If so, an execution department in charge of production quality should start updating the current standards for evaluating production quality performance (step S42). If not, the real-time production performance improving method of the invention is terminated. In this way, production process is improved. Furthermore, based on repeated executions of the proposed method, root causes of problems may be recognized/confirmed and fed back to responsible departments on source end. Based on the information received, the responsible departments are able to take necessary measures/actions to prevent the same root causes from occurring again, and monitor the production performance at the same time. Thus, the root causes may be immediately removed based on the needs of information technology and the conditions of the KPI. Thus, the most economical and rapid way of improving production performance of enterprises is achieved.

In addition, the real-time production performance improving method of the invention may achieve the following advantages:

First, the real-time production performance improving system 1 constantly analyzes various problems of the production machines 12 in real time during operation of the production machines 12. In this manner, root causes of the problems may be immediately found/confirmed. The root causes are then sent to an assigned manager of enterprise who determines which task team should be responsible for the problems. Thus, long-term preventive measures for the problems may be established. As a consequence, the responsible task team will be given proper pressure for timely and efficiently solving the problems. If the problems are not solved yet, the real-time production performance improving system 1 will repeatedly perform the real-time production performance improving method, forcing the same problems to repeatedly show up or resulting in an accumulation of problems' consequential loss. Therefore, the task team will be under pressure for timely solving the problems, improving the overall production performance for enterprises or organizations.

Second, the required performance level in the performance standard determination step S2 may serve as short-term or long-term performance objectives of enterprises. When the actual performance is a great deal lower than the required performance level, the required performance level might not be suitable for the current situation of the enterprises. Thus, the required performance level must be modified and performance gap and root causes for poor (actual) performance must be found and identified, so as to take responsive measures to improve the poor (actual) performance.

Third, the enterprises may utilize the "D-M-A-I-C" steps of Six Sigma for problem analysis in order to rapidly solve the problems. Thus, better production performance is ensured for enterprises. In addition, information associated with the problems is also collected for analysis of root causes of the problems in order for the task team to work out the best solutions for further improvement.

Fourth, the "D-M-A-I-C" mechanism may be further combined with information technology, and the real-time production performance improving system 1 may monitor the condition of production performance of a production line and collect information of performance gap according to the monitored results. The information of performance gap is further classified and analyzed so that the task team may immediately find out root causes of problems and further solve the problems based on priority of the performance gap information. Thus, the overall production performance of enterprises is improved.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A real-time production performance improving method executed by a real-time production performance improving system having a monitoring unit, at least one production machine, a database and a problem handling unit, comprising:

a real-time monitoring step instantly monitoring an operation status of the at least one production machine via the monitoring unit, recording the monitored operation status into the database via the monitoring unit, and determining whether the operation status of the at least one production machine has changed via the monitoring unit;

a performance satisfaction determination step determining whether the change in the operation status meets a required performance level when the operation status of the at least one production machine has changed, as performed by the monitoring unit, wherein the monitoring unit keeps monitoring the at least one production machine to detect a next change in the operation status of the at least one production machine when the change in the operation status meets the required performance level, and wherein the performance satisfaction determination step determines whether the next change in the operation status meets the required performance level, as performed by the monitoring unit; and a real-time performance improving step sending information illustrating the at least one problem, that causes the change in the operation status, to an assigned task team for prompt analysis when the change in the operation status does not meet the required performance level, as performed by the problem handling unit, wherein the monitoring unit keeps monitoring the operation status of the at least one production machine in order for the at least one problem to be solved, and the at least one problem constantly shows up until the at least one problem is solved.

2. The real-time production performance improving method as claimed in claim 1, wherein the real-time monitoring step comprises:

a status checking step instantly monitoring the operation status of the at least one production machine based on a period of monitoring time set by the monitoring unit; and a status determination step performing a status updating step when the operation status of the at least one production machine has changed, and performing the status checking step when the operation status of the at least one production machine has not changed, wherein the status updating step records the latest status of the at least one production machine and the at least one problem in a status table of the database.

3. The real-time production performance improving method as claimed in claim 2, wherein the at least one production machine has three operation statuses "OFF", "normal" and "shutdown" to be monitored by the monitoring unit.

4. The real-time production performance improving method as claimed in claim 3, wherein the operation status of the at least one production machine has three types of changes:

"OFF to normal", "normal to OFF", "normal to shutdown" and "shutdown to normal".

5. The real-time production performance improving method as claimed in claim 1, wherein the required performance level is determined based on a mechanism of Key Performance Indicator (KPI).

6. The real-time production performance improving method as claimed in claim 5, wherein the Key Performance Indicator is set based on three criteria: the total number of times of shutdown of one of the at least one production machine is less than 10, the number of times of shutdown caused by a same one of the at least one problem is less than 6, and the shutdown period is shorter than 2 hours.

7. The real-time production performance improving method as claimed in claim 1, wherein the required performance level is determined based on the amount of property loss.

8. The real-time production performance improving method as claimed in claim 1, wherein the real-time performance improving step comprises:

a problem classification step classifying the at least one problem of the at least one production machine when the change in status of the at least one production machine does not meet the required performance level, so as to determine a task team responsible for the at least one problem, wherein a problem list listing the at least one problem is sent to the task team by a problem handling unit;

a problem confirmation step confirming whether the at least one problem is directed to the task team; an arbitration step determining which one of a plurality of task teams, including the task team, is responsible for the at least one problem, when the confirmation of the problem confirmation step is negative;

an analyzing and improving step analyzing the at least one problem and providing a solution therefor; and a solution confirmation step solving the at least one problem using the solution, wherein the analyzing and improving step is repeated when the at least one problem is not solved using the solution.

9. The real-time production performance improving method as claimed in claim 8, wherein the analyzing and improving step analyzes the at least one problem in a mechanism of DMAIC.

10. The real-time production performance improving method as claimed in claim 1, further comprising an update step following the real-time performance improving step for determining whether current standards for evaluating production quality performance should be updated, and further updating the current standards if the determination is positive.

11. The real-time production performance improving method as claimed in claim 10, wherein the current standards for evaluating production quality performance include product specification, production process and performance standards.

12. The real-time production performance improving method as claimed in claim 1, wherein preventive measures are taken after root causes of the at least one problem have been found/confirmed, so as to prevent the same root causes from recurrence.

* * * * *